United States Patent [19]

Berthier

[11] 4,129,401

[45] Dec. 12, 1978

[54] HOLE-CUTTING TOOL WITH A FREE CENTRAL PORTION AND EJECTOR APPARATUS FOR THE CORE OF METAL FORMED BY THE TOOL

[75] Inventor: Pierre Berthier, La Grand Croix, France

[73] Assignee: Manufacture de Vilebrequins de Lorette S.A., Chamond, France

[21] Appl. No.: 810,841

[22] Filed: Jun. 27, 1977

[30] Foreign Application Priority Data

Jul. 7, 1976 [FR] France .................................. 76 21553

[51] Int. Cl.$^2$ ..................... B23B 27/10; B23B 51/00; B23B 41/02
[52] U.S. Cl. ..................................... 408/59; 408/186; 408/204; 408/231; 408/703
[58] Field of Search ...................... 408/56, 57, 58, 59, 408/204, 703, 231, 186

[56] References Cited

U.S. PATENT DOCUMENTS

| | | | |
|---|---|---|---|
| 2,184,919 | 12/1939 | Miller | 408/56 |
| 2,484,150 | 10/1949 | Brown | 408/204 |
| 3,591,306 | 7/1971 | Kaser | 408/204 |
| 3,950,111 | 4/1976 | Churchwell et al. | 408/703 |

*Primary Examiner*—Harrison L. Hinson
*Attorney, Agent, or Firm*—Haseltine, Lake & Waters

[57] ABSTRACT

A hole-forming tool comprising a body adapted for being driven in rotation and including a front portion having an axial bore. A plurality of cutting plates are removably secured to the front face of the front portion of the body for cutting a ring of material from a metal workpiece while leaving a non-cut core in the axial bore. The body carries an ejector in the bore for ejecting the core at the end of the cutting operation. The ejector can be a slidable member which is resiliently urged into the bore and which opposes the core to effect displacement thereof from the workpiece when the tool has completely cut through the workpiece. A system is also provided for axially distributing a lubricating liquid through the bore to the cutting plates.

9 Claims, 5 Drawing Figures

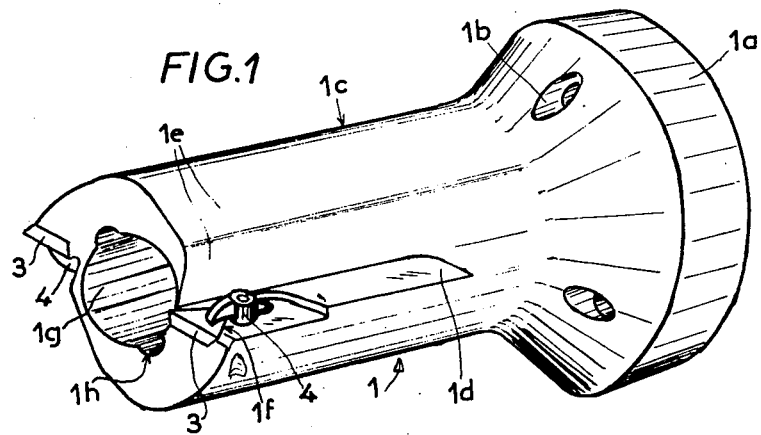
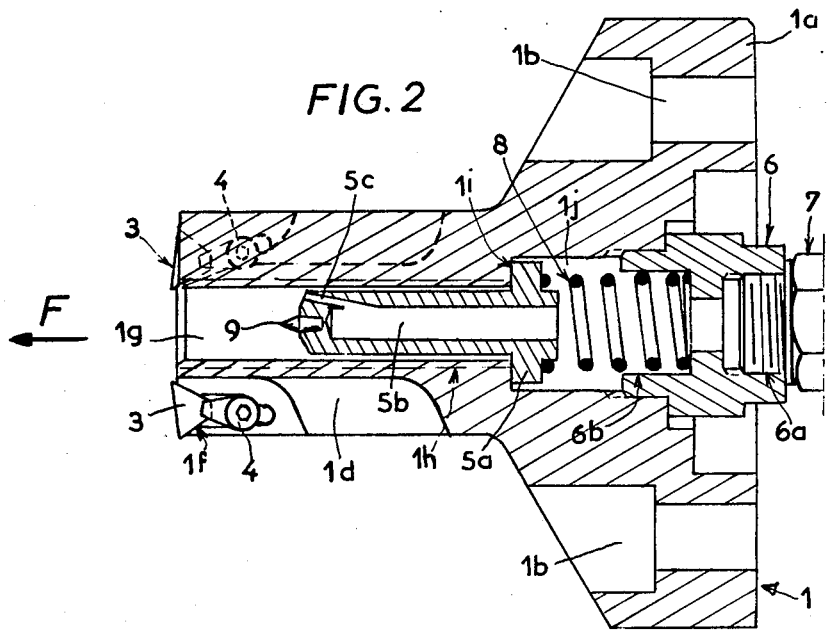

HOLE-CUTTING TOOL WITH A FREE CENTRAL PORTION AND EJECTOR APPARATUS FOR THE CORE OF METAL FORMED BY THE TOOL

FIELD OF THE INVENTION

The invention relates to a cutting tool having a central free region for cutting a ring in a metallic body while leaving a core, said tool having an ejector apparatus for removal of the core.

The invention generally relates to the technical field of machining metals by removal of material and more particularly, by forming holes in metallic pieces such as thick plates.

BACKGROUND

It is well known to form holes of more or less large diameter in thin metallic pieces (sheets) by the principle of coring, that is to say, by tools whose center is free which permits forming a hole by leaving a non-cut volume of material at the center, called the "core."

The known hole-forming tools such as "barrel drills" comprise a helicoidal drill having a central channel for passage of lubricant to permit deep coring. These tools have a number of disadvantages, namely: limited cutting speed due to the substantial pressure forces, rough surface state of the formed holes, large tolerances of the holes, and poor geometry of the obtained holes by the action of the cuttings; the tools also require frequent resharpening.

SUMMARY OF THE INVENTION

An object of the invention is to provide a cutting tool which avoids the above disadvantages.

A further object of the invention is to provide a tool for cutting holes in metallic pieces allowing deep coring with performances clearly improved as regards the speed of cutting, the tolerances and the state of the surfaces, and the cost of operation.

The tool, according to the invention, comprises a hollow body having a front portion which receives removable cutting plates which are fixed mechanically and present cutting edges facing the piece to be pierced while behind the plates the body has deflectors for discharge of cuttings and then a collar portion for attachment to a machine-tool driver.

According to a feature of the invention, the body has an axial bore whose front portion permits the passage of a core cut from the piece and an ejector apparatus maintained in pressure at the rear portion of the bore.

According to another feature, the ejector apparatus has at least one channel or orifice facing the core and connected to a compression chamber formed behind the ejector to create a force sufficient for the ejection of the core by lubricant fluid introduced in the orifice.

BRIEF DESCRIPTION OF THE DRAWINGS

FIG. 1 is a perspective view of the tool according to the invention.

FIG. 2 is a longitudinal sectional view of the tool according to the invention.

DETAILED DESCRIPTION

Figure 3:
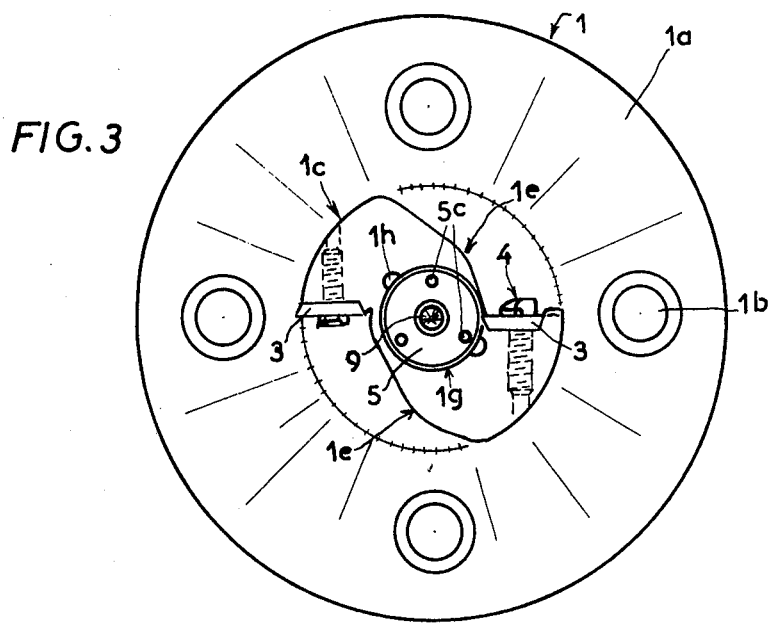
FIG. 3 is a front view of the tool.

In order to make more concrete the objects of the invention it will now be described with reference to the nonlimiting embodiment illustrated in the figures of the drawing.

The tool of the invention comprises a hollow body 1 whose rear portion is shaped for connection with a rotatable drive member of a machine tool. In the illustrated embodiment this connection is effected by a collar portion 1a having bores 1b for the passage of bolts 2.

From the collar portion, the body is constituted by at least two profiled portions 1c cut from a base cylinder to form, along at least two opposed diametric planes, flat surfaces 1d adapted to receive cutting plates 3. Adjacent each of the flat surface 1d there is formed a relief region 1e for discharge of cuttings or chips. The plates 3 are fixed at the end of the body by clamps 4 or the like and the plates are engaged in countersinks 1f in the flat surfaces in a manner to present their cutting edges along an angle of about 5° with respect to a plane perpendicular to the longitudinal axis of the tool as best seen in FIG. 2 and to form a cutting diameter equal or greater than the base diameter of the front portion. The clamps 4 are threadably engaged in the body as best seen in FIG. 3.

The body has an interior bore 1g with peripheral grooves 1h extending from the front face up to the collar portion or substantially thereto. In this bore, there is freely mounted a power ejector 5 with shoulders 5a adapted for bearing against the shoulder 1i of a chamber 1j following the bore 1g. At the end of chamber 1j there is threadably engaged a stop member 6 having an interior threading 6a receiving a connector 7 for the flow of a liquid whereas the front of the stop member 6 has a recess 6b for the guiding and support of a coil spring 8 urging the ejector 5 against the shoulder 1i.

The ejector 5 has on its front face opposed to the pieces to be machined, a central point member 9 of material of great hardness whose role will be described hereafter. The ejector also has a blind bore 5b terminating slightly in front of the point member 9.

Figure 4:
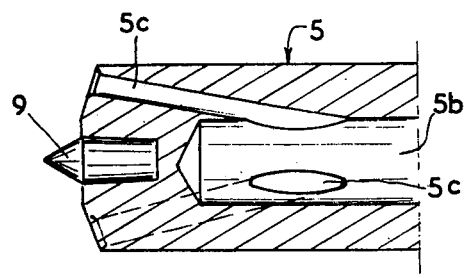
FIG. 4 is a partial sectional view on enlarged scale of the front extremity of an ejector in the tool.

From the bottom of the bore 5b there extends a plurality of inclined orifices 5c (three equally spaced orifices in the illustrated embodiment) which open proximate the periphery of the ejector at the front face thereof as best seen in FIGS. 3 and 4.

The operation of the tool will next be described with reference particularly to FIG. 5.

The tool is mounted on a rotatable drive member of the machine and is advanced against the piece A to be machined. The plates 3 are suitably oriented for cutting a ring A1 in proportion to the advancement of the tool while leaving a central portion or core A2 which enters the bore 1g of the body of the tool. During this operation, suitable liquid lubricant is introduced, optionally under high pressure, through the connector 7 and the stop member 6 and the lubricant then flows through the chamber 1j, the bore 5b of the ejector and the orifices 5c, as well as into the grooves 1h in the bore 1g.

When the plates 3 have cut through to the other side of the piece A, the core A2 is found in contact with the point member 9 of the ejector which slightly penetrates into the core while effecting its centering. The spring 8 is compressed until it overcomes the resistance of the core which is then ejected.

Figure 5:
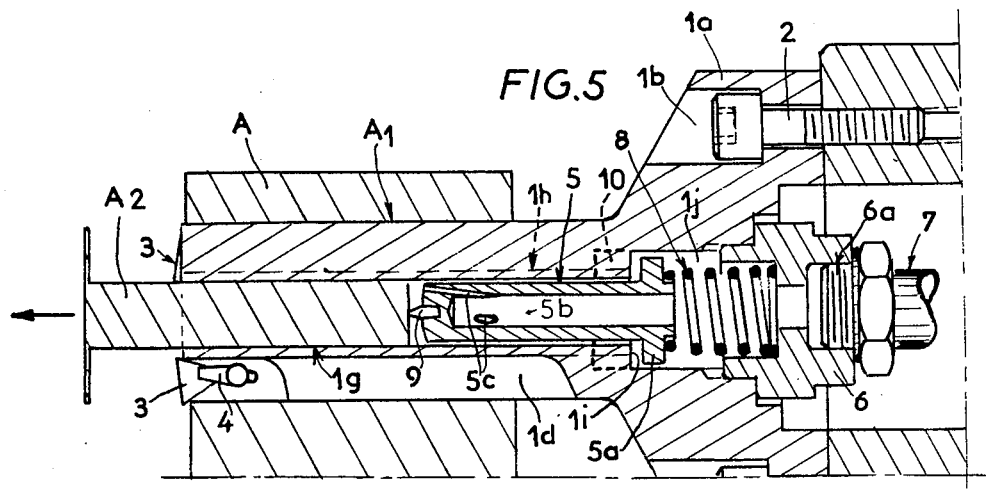
FIG. 5 is a longitudinal sectional view of the tool shown at the end of forming a hole in a piece.

Of course, a number of variations can be introduced within the framework of the invention, such as: the use of a different number and shape of the fluid passages in the ejector and between the bore and the ejector; diverse shapes of the connecting portion of the body of the tool with the drive member of the machine; different numbers of cutting plates and of relief profiles; replacement of the coil spring by other equivalent means such as elastic rings, blades, jacks or the like; adjustable positioning of the abutment of the ejector, for example, by stop 10 threaded in chamber 1j (shown in dotted lines in FIG. 5).

One can also provide for ejection of the core A2 solely by the pressure of the lubrication fluid without the aid of an elastic means. This can be achieved in the disclosed arrangement wherein chamber 1j is put under pressure, whereby small orifices 1h and 5c constitute nozzles increasing the pressure force. There is also conceived the provision of nozzles directly in the body while eliminating the power ejector.

The following advantages follow from the description:

- the cutting speed with the tool of the invention is several times greater than that possible with conventional tools;
- the pressure force of the tool of the invention is several times lower than that produced by conventional tools;
- there is obtained a very good state of the surface at the time of a single penetration in solid material due to the constant lubrication during the period of operation and by the good removal of the cuttings which do not cause damage to the surface, such as burnishing, scoring and the like;
- the holes produced by the tool of the invention have reduced tolerances and minimum geometrical errors even for great depths; by way of example, the tool is capable of cutting holes whose length is about five times the diameter when there is no external guidance of the tool. Of course, the tools could be each made to effect the hole cutting in a range of lengths, that is to say, with a portion for penetration covering several lengths of holes and an ejector suitably placed in abutment, particularly with an adjustable abutment;
- the tool has a low cost of operation by elimination of sharpening costs, by the use of a simplified lubrication installation without an attached filtering apparatus, and by the utilization of any current drive machine.

The invention is not limited only to the embodiments described nor to the particular means, but in contrast embraces all variations and modifications if defined by the appended claims.

What is claimed is:

1. A hole-forming tool comprising a body adapted for being driven in rotation, said body including a front portion having an axial bore, a plurality of cutting plates removably secured to said front portion for cutting a ring from a metal workpiece while leaving a non-cut core in the axial bore, ejector means in said bore for ejecting said core at the end of the cutting operation, and means for axially distributing a liquid through said bore, said ejector means comprising an ejector member slidable in said bore, and resilient means urging said ejector member into said bore for ejection of the core, said body having a chamber communicating with the means for axially distributing the liquid, said ejector member having a blind axial bore communicating with said chamber, and orifices extending into said bore and opening at said body at the front face thereof which faces the core.

2. A tool as claimed in claim 1 wherein said ejector member includes a shoulder which abuts against said body in said chamber to limit penetration of said ejector member in said bore.

3. A tool as claimed in claim 2 comprising a pointed member secured to said ejector member at the front face thereof for penetrating into said core and guiding the core during ejection thereof.

4. A tool as claimed in claim 3 wherein said resilient means acts on said ejector member to urge the same against said shoulder.

5. A tool as claimed in claim 4 wherein said means for axially distributing the liquid comprises a connector in said body against which the resilient means bears, said connector having a bore for passage of the liquid of said chamber.

6. A tool as claimed in claim 2 wherein said shoulder is constituted by a threaded adjustment member in said bore in said body.

7. A tool as claimed in claim 1 wherein said front portion of the body has diametrically opposed flat surfaces with relief regions therebetween for flow of cuttings from the cutting blades, said flat surfaces having countersinks therein in which said cutting plates are mounted, said cutting plates having front cutting surfaces extending at an angle of 5° with respect to a plane perpendicular to the longitudinal axis of the tool.

8. A tool as claimed in claim 7 comprising clamping means threaded in said body for removably holding said cutting blades in said countersinks in the flat surfaces.

9. A tool as claimed in claim 1 wherein said body has axial grooves therein opening into said bore for passage of liquid therethrough.

* * * * *